United States Patent Office 3,845,191
Patented Oct. 29, 1974

3,845,191
METHOD OF REMOVING HALOCARBONS FROM GASES
John MacMillan Bruce, Jr., Wilmington, Del., assignor to E. I. du Pont de Nemours and Company, Wilmington, Del.
No Drawing. Filed June 2, 1972, Ser. No. 259,073
Int. Cl. B01d 53/34
U.S. Cl. 423—240                                8 Claims

ABSTRACT OF THE DISCLOSURE

A process for the oxidation of halocarbons comprising chlorofluorocarbons which comprises contacting the halocarbon with oxygen and a member selected from the class consisting of oxides of calcium, aluminum, barium, magnesium, iron, nickel and mixtures thereof at from 750° C. to 1100° C.

---

This invention relates to the oxidation of halocarbons. Particularly, this invention relates to the oxidation of halocarbons comprising chlorofluorocarbons by the use of oxygen and metal oxides.

In the production of various halogen containing intermediates, waste streams, of course, are present. For pollution abatement purposes it is desirable to convert these waste streams which contain, inter alia, various mixtures of halocarbons including chlorofluorocarbons to harmless substances. Efficient and inexpensive processes have been sought to accomplish the above.

A process has been found which fulfills the above requirements. It is a process for the oxidation of halocarbons comprising chlorofluorocarbons which comprises contacting the halocarbon with oxygen and a member selected from the class consisting of oxides of calcium, aluminum, barium, magnesium, iron, nickel and mixtures thereof at from 750° C. to 1100° C.

The waste streams containing the halocarbons comprising chlorofluorocarbons are normally converted by the process of this invention to the respective metal halogen compounds, carbon dioxide and water. The hydrogen halides may in some cases be present in small amounts after the process of this invention. These can be removed from the products of the process of this invention by contacting the product stream with a base.

As is stated above, the waste streams from the intermediate preparation processes normally contain halocarbons, including chlorofluorocarbons. The halocarbons which may be present include besides the chlorofluorocarbons, fluorocarbons, hydrofluorocarbons, hydrochlorocarbons and hydrochlorofluorocarbons. In particular, the process of this invention is useful in oxidizing the waste streams from the production of hexafluoropropylene, tetrafluoroethylene and chlorotrifluoroethylene. These waste streams are normally gaseous and are thesefore gaseous when utilized in the process of this invention. However, liquid waste streams can also be oxidized using the process of this invention. They are, of course, converted to a gaseous form during the process of this invention due to the high temperatures involved therein.

The process of this invention must be carried out in the presence of a gas containing molecular oxygen. The remainder of the gas, if any, should be inert to the reaction taking place such as nitrogen. Air is the preferred gas. The presence of sufficient oxygen in the process is critical in order for there to be no carbon formation. The ratio of oxygen to the halocarbon in the process is at least 0.4:1 by volume in order for there to be complete conversion of the halocarbon to the metal halide, carbon dioxide and water. The amount of oxygen used is determined by the economics of the system for everything that is present in the reactor must be heated up to the contact temperature. Normally, a ratio of no more than 10:1 is used. The preferred ratio is 1:1 to 3:1.

Normally, there is sufficient metal oxide present in the process of this invention to convert all the halocarbon to metal halide.

The process of this inventioin can be either batch or continuous. If it is batch, the amount of time during which the process is continued is determined by the point in which the bed of metal oxides becomes sufficiently converted to the metal halide that conversion of the halocarbon is no longer taking place to any large extent. If the process is continuous, the metal oxide is replaced at a rate such that there is always sufficient metal oxide present to completely convert the halocarbon to the various products referred to above.

The process is normally carried out at a temperature of at least 750° C. Normally, temperatures above 1100° C. are not desirable. The mixture of halocarbon and oxygen should not be heated to the high temperature until it is in contact with the metal oxide.

The metal oxides are normally placed in the reactor which can be merely a tube. The gases flow through the metal oxides in the reactor. Thus, the metal oxides can be in the form of a fluidized or nonfluidized bed, the former being preferred.

The process of this invention is normally and preferably carried out at atmospheric pressure. However, pressures up to 10 atmospheres can be utilized. The normal contact time necessary to convert the halocarbon to the metal halide, water and carbon dioxide is from 1–60 seconds. The preferred time is 5–15 seconds.

The metal oxides can vary over the wide range of particle sizes. Normally, 100 mesh to 5 mesh particles are used. Generally speaking, a smaller particle size is preferred. This will depend however on the type of operation which is used.

As stated above, the process of this invention is useful for converting halocarbon waste streams to metal halides, water and carbon dioxide, all of which are innocuous. Thus, the process of this invention is useful in avoiding pollution caused by halocarbon waste streams.

The following Examples are meant to illustrate but not to limit the invention. All parts and percentages are by volume unless otherwise specified.

EXAMPLE I

The reactor consisted of a 1" I.D. x 18" 310 stainless steel pipe fitted with end caps, a thermocouple well which was centered longitudinally within the pipe, and inlet and exit ports. The reactor was mounted horizontally in a 1" x 12" split tube electric heater.

The flow rates of the reactant gases were determined using gas flow meters and the gases were mixed prior to entering the reactor.

The reactor was charged with 75.6 g. (6" bed) of calcium oxide (through 8 and on 20 mesh) which was held in place by fine platinum screens. The reactor and its contents were heated to 575° C. and were maintained at this temperature under a slow stream of nitrogen for a period of about 16 hours. The temperature was then raised to about 850° C. and air and a mixture of hexafluoropropylene and chlorodifluoromethane of approximate composition $C_6F_{12}HCl$ were passed over the calcium oxide.

Samples of the effluent were then analyzed by a combination of gas chromatography and infrared spectroscopy. Gas chromatography separated the low boiling components from water which was a product of the reaction. The various components of the low boiling fraction excluding water were identified by infrared analysis. Results are shown in Table I.

TABLE I

| Sample* | Temp. (°C.) | Hours operation | Contact time, seconds | Conversion | Percent $CO_2$ | $CF_4$ | $C_2F_6$ | $CF_3Cl$ |
|---|---|---|---|---|---|---|---|---|
| 1 | 847 | 1.2 | 20 | ~complete | 94 | 2½ | 2½ | 1 |
| 2 | 848 | 4.0 | 20 | do | 86 | 4 | 1 | 9 |
| 3 | 901 | 5.0 | 20 | do | 92 | 6 | 1 | 1 |
| 4 | 896 | 6.0 | 20 | do | 94 | 5 | 1 | |
| 5 | 891 | 6.6 | 20 | do | 92 | 7 | 1 | |
| 6 | 894 | 7.1 | 20 | do | 85 | 12 | 2 | 1 |
| 7 | 895 | 7.9 | 20 | do | 88 | 10 | 2 | |
| 8 | 957 | 8.6 | 20 | do | 89 | 11 | | |
| 9 | 954 | 11.8 | 20 | do | 86 | 14 | | |
| 10 | 852 | 12.7 | 20 | do | 84 | 14 | 2 | |

* The air/$C_6F_{12}HCl$ ratio was 9:1.

Results showed essentially complete conversion of the halohydrocarbon to predominantly $CO_2$. Elemental analysis indicated that the halogens were retained within the reactor in the form of the calcium salts.

EXAMPLE II

This reaction was run as indicated in Example I. A 1" I.D. x 18" nickel reactor was charged with 94 g. (12" bed) of $Al_2O_3$ in the form of ⅛" balls and heated to a temperature of 850° C. Air and a complex mixture of gases was passed over the alumina. The mixed gases had an approximate formula of $C_{2.6}F_{4.8}HCl_{1.1}$ and the air/$C_{2.6}F_{4.8}HCl_{1.1}$ ratio varied between about 5:1 to about 24:1 but the majority of the time it was maintained at about 9:1.

After operating for about 40 hours the effluent consisted of 92 percent $CO_2$ and 8 percent $CF_4$ plus moisture. Analysis of the alumina bed for the presence of fluoride found a gradation in the fluoride level from inlet end to exit end with the values being 58.6 percent, 37.7 percent and 25.5 percent in that order. Analysis was performed as in Example I.

EXAMPLE III

A ¾" I.D. x 8" Inconel reactor was charged with 25 g. of 6-8 mesh alumina spheres as in Example I. The reactor was placed in a 6" split electric heater and heated at about 600° C. under nitrogen for 16 hours. The temperature was then raised to 837° and a mixture of hexafluoropropylene and chlorodifluoromethane of approximate composition $C_2F_4HCl$, plus air, was passed through the reactor. The air/halocarbon ratio varied from 4.5:1 to 9:1. After about 4 hours of operation the halocarbon mixture was replaced by a very complex mixture of approximate empirical formula $C_{3.1}F_{5.9}ClH_{1.1}$ and the air to halocarbon ratio was maintained at 4.5:1. During the course of the run the temperature varied between 837° and 874° while the contact time varied from about 8 to 15 seconds. After about 7.5 hours of operation the exit gas contained, in addition to moisture, the reaction products: $CO_2$, 87 percent; $CF_4$, 10 percent; $CF_3Cl$, 3 percent. Analysis was performed as in Example I.

EXAMPLE IV

This Example was carried out in a manner similar to that described in Example I. Into a 1" I.D. x 17" nickel reactor were placed 54 g. (6" bed) of bauxite. Air and a hexafluoropropylene-chlorodifluoromethane mixture of composition $C_6F_{12}HCl$ was passed through the reactor. The air to halocarbon ratio was 9:1. The temperature in the reactor ranged from 812 to 843° C. and the contact times ranged from 3 to about 15 seconds. A sample of effluent gas was analyzed by mass spectroscopy and was found to contain 87.5 percent $CO_2$, 10.4 percent $SiF_4$, 1.2 percent air and 0.9 percent water. The $SiF_4$ was formed from the silaceous material present in the bauxite. The silicon tetrafluoride was removed by reacting the effluent stream with CaO at elevated temperatures.

EXAMPLE V

By operating in a manner similar to Example I, air and a mixture of hexafluoropropylene and chlorodifluoromethane of approximate composition $C_6F_{12}HCl$ were passed over lime contained in a 1" x 17" nickel reactor. After operating for a period of over 6 hours, the effluent contained over 99 percent $CO_2$ plus a trace of $CF_4$. Conditions were: temperature, ~870° C.; contact time, ~9 seconds; air to halocarbon ratio, about 5:1 by volume. Analysis was performed as in Example I.

What is claimed is:

1. A process for the purification by oxidation of a waste stream containing a material selected from the group consisting of chlorofluorocarbon, chlorofluorohydrocarbon, and mixtures thereof which comprises at a temperature of 750° C. to 1100° C. contacting said stream and oxygen with a bed containing a metal oxide selected from the group consisting of an oxide of either calcium, aluminum, barium, magnesium, iron, or nickel and mixtures to form the corresponding metal halides and carbon dioxide from the chlorofluorocarbon or the corresponding metal halides, carbon dioxide and water from the chlorofluorohydrocarbon.

2. The process of Claim 1 in which the pressure is from 1 to 10 atmospheres absolute.

3. The process of Claim 2 in which the contact time is from 1 to 60 seconds.

4. The process of Claim 3 in which the ratio of the volume of the oxygen to the said material is at least 0.4:1.

5. The process of Claim 4 in which the oxygen is in the form of air.

6. The process of Claim 1 wherein said material is chlorofluorocarbon.

7. The process of Claim 1 wherein said metal oxide is an oxide of calcium, aluminum, barium, magnesium, nickel and mixtures thereof.

8. The process of Claim 7 wherein said metal oxide is calcium oxide or aluminum oxide.

References Cited

UNITED STATES PATENTS

| 3,483,128 | 12/1969 | Rodi et al. | 423—497 X |
| 3,268,296 | 8/1966 | Hall et al. | 423—240 X |
| 2,537,448 | 1/1951 | Engel | 423—240 |
| 3,007,772 | 11/1961 | Olstowski | 423—493 X |

EARL C. THOMAS, Primary Examiner

U.S. Cl. X.R.

423—437, 489, 490, 493, 495, 497